(12) United States Patent
Tomlinson

(10) Patent No.: US 11,423,808 B2
(45) Date of Patent: Aug. 23, 2022

(54) RECYCLABLE LINER FOR LABEL ASSEMBLY

(71) Applicant: Labelcraft Products Ltd., Pickering (CA)

(72) Inventor: Brian Tomlinson, Pickering (CA)

(73) Assignee: Labelcraft Products Ltd., Pickering (CA)

( * ) Notice: Subject to any disclaimer, the term of this patent is extended or adjusted under 35 U.S.C. 154(b) by 4 days.

(21) Appl. No.: 16/889,134

(22) Filed: Jun. 1, 2020

(65) Prior Publication Data

US 2020/0302829 A1 Sep. 24, 2020

Related U.S. Application Data

(63) Continuation of application No. 16/098,631, filed as application No. PCT/CA2017/050541 on May 4, 2017, now Pat. No. 10,706,748.

(Continued)

(51) Int. Cl.
*B05D 1/00* (2006.01)
*G09F 3/10* (2006.01)
(Continued)

(52) U.S. Cl.
CPC ............... *G09F 3/10* (2013.01); *B05D 1/00* (2013.01); *B05D 3/108* (2013.01); *B31D 1/02* (2013.01); *B31D 1/021* (2013.01); *B32B 7/06* (2013.01); *B32B 7/10* (2013.01); *B32B 7/12* (2013.01); *B32B 29/005* (2013.01); *B32B 29/06* (2013.01); *C09J 7/21* (2018.01); *C09J 7/403* (2018.01); *D21H 19/32* (2013.01); *G09F 3/02* (2013.01); *B05D 3/107* (2013.01);
(Continued)

(58) Field of Classification Search
CPC .............................. B05D 1/00; B05D 2203/00
See application file for complete search history.

(56) References Cited

U.S. PATENT DOCUMENTS 3,854,229 A 12/1974 Morgan
5,023,138 A 6/1991 McIntyre
(Continued)

FOREIGN PATENT DOCUMENTS

CA 1248412 A 1/1989
WO 2013188739 A1 12/2013

OTHER PUBLICATIONS

WIPO: International Search Report and Written Opinion relating to PCT application No. PCT/CA2017/050541 dated Aug. 16, 2017.
(Continued)

*Primary Examiner* — Hai Y Zhang
(74) *Attorney, Agent, or Firm* — Rowand LLP

(57) ABSTRACT

In accordance with the present application, there is provided a release liner and method of preparing a liner for a label assembly. The release liner includes paper having a first side that does not have a machine finish or gloss finish or a coating; and a silicone treatment applied to the first side of the paper. The method of preparing a liner for a label assembly includes applying a coat of silicone to a paper at a side of the paper that does not have a machine finish or gloss finish and is otherwise uncoated; and curing the silicone. The release liner includes paper having a silicone coat weight of 0.5 lb/ream or less.

10 Claims, 3 Drawing Sheets

Related U.S. Application Data

(60) Provisional application No. 62/332,006, filed on May 5, 2016.

(51) Int. Cl.

| | | |
|---|---|---|
| *B32B 7/06* | (2019.01) | |
| *B32B 7/10* | (2006.01) | |
| *B32B 29/06* | (2006.01) | |
| *G09F 3/02* | (2006.01) | |
| *C09J 7/40* | (2018.01) | |
| *C09J 7/21* | (2018.01) | |
| *B32B 29/00* | (2006.01) | |
| *B32B 7/12* | (2006.01) | |
| *B31D 1/02* | (2006.01) | |
| *D21H 19/32* | (2006.01) | |
| *B05D 3/10* | (2006.01) | |
| *B31D 1/00* | (2017.01) | |

(52) U.S. Cl.
CPC ........ *B05D 2203/00* (2013.01); *B31D 1/0075* (2013.01); *B32B 2250/02* (2013.01); *B32B 2250/26* (2013.01); *B32B 2255/12* (2013.01); *B32B 2255/26* (2013.01); *B32B 2307/72* (2013.01); *B32B 2307/748* (2013.01); *B32B 2405/00* (2013.01); *B32B 2519/00* (2013.01); *C09J 2203/334* (2013.01); *C09J 2400/283* (2013.01); *C09J 2483/005* (2013.01); *G09F 2003/023* (2013.01); *G09F 2003/0223* (2013.01); *G09F 2003/0255* (2013.01)

(56) References Cited

U.S. PATENT DOCUMENTS

| | | |
|---|---|---|
| 5,421,942 A | 6/1995 | Hoffman |
| 5,507,901 A | 4/1996 | Limina et al. |
| 5,782,494 A | 7/1998 | Crandall et al. |
| 6,110,554 A * | 8/2000 | Moeller .................... G09F 3/10 283/81 |
| 7,241,357 B2 | 10/2007 | Roth et al. |
| 2004/0001930 A1 | 1/2004 | Roth et al. |
| 2008/0081143 A1* | 4/2008 | Ukei ........................ C09J 7/403 428/141 |
| 2008/0318010 A1 | 12/2008 | Wozniak et al. |
| 2009/0133827 A1 | 5/2009 | Wozniak et al. |

OTHER PUBLICATIONS

EPO: Extended European Search Report relating to European Patent Application No. 17792335.6, dated Nov. 13, 2019.

EPO: Examiner's Report relating to EP patent application No. 17792335.6, dated Apr. 23, 2021.

EPO: Extended European Search Report relating to EP application No. 17792335.6, dated Nov. 13, 2019.

\* cited by examiner

RECYCLABLE LINER FOR LABEL ASSEMBLY

RELATED APPLICATION

This application is a continuation of U.S. patent application Ser. No. 16/098,631 filed on Nov. 2, 2018 and claims priority to U.S. provisional patent application No. 62/332,006 filed on May 5, 2016, the contents of both are herein incorporated by reference.

FIELD

The present application relates to a label assembly and, more particularly, to a pressure-sensitive label having a recyclable liner and methods for manufacturing such liners and labels.

BACKGROUND

Pressure sensitive labels are commonly applied to various products to identify information associated with the product. Such labels are used in numerous environments to provide a variety of functions including, for example, identifying the source or destination of goods, identifying a price associated with goods, identifying nutritional information associated with a food product, etc.

Typically, pressure sensitive labels include a top layer which is configured for being printed upon. The top layer is coated with adhesive on a bottom side. The label may not be used immediately following its manufacture and so a release liner is placed on the other side of the adhesive to prevent the adhesive from unintentionally sticking to other items. The release liner is coated with a silicone release agent to allow the release liner to be easily removed from the adhesive when a user is ready to put the label to use.

Pressure sensitive labels are commonly manufactured using a machine finished paper product or super calendered kraft (SCK) paper for the release liner. That is, the paper is processed to provide a smooth surface on at least one side of the paper. Silicone is then applied to the finished side of the paper that will form the release liner. The paper's smooth surface prevents the silicone from soaking into the fibers of the paper and the silicone is effectively layered on top of the paper. That is, the smooth finish prevents the silicone from migrating into the paper itself and so the silicone forms a layer on top of the paper. Then, an adhesive is attached to the label using a transfer coating process. More particularly, the adhesive is applied to the silicone layer of the release liner. The release liner and the adhesive are then passed through a dryer which removes the water from the adhesive. The adhesive is then "transferred" to the back of the face sheet of the label itself. More particularly, the liner with the adhesive is laminated to the back of the face sheet by layering the face sheet on the exposed side of the adhesive. The face sheet is not treated with silicone and so the adhesive adheres better to the face sheet than the silicone treated liner and the adhesive effectively migrates to the back of the face sheet.

Typical municipal recycling facilities are not equipped to recycle release liners of the type described above. More particularly, the silicone release agent may need to be scraped off the release liner to permit recycling. Since this process is difficult, used release liners are typically sent to the landfill.

While this problem has been recognized for some time, previous solutions to this problem have been inadequate. More specifically, attempts to solve this issue have led to the development of liner-less labels. These labels do not have a release liner and typically have a silicone release agent applied to the printable side of the top layer to allow the labels to be released from the roll. The disadvantages to this approach are numerous. For example, since the labels do not have a base layer (i.e. a liner), die cut shapes are not possible.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DETAILED DESCRIPTION

In accordance with the present application, there is provided a label assembly. The label assembly includes a top layer having a front side and a back side and an adhesive covering the entirety of the back side of the top layer. The label assembly also includes a silicone-treated liner contacting the adhesive to sandwich the adhesive between the top layer and the liner. The silicone-treated liner includes paper having a silicone coat weight of 0.5 lb/ream or less.

In another aspect, there is provided a method of preparing a label assembly. The method includes: forming a liner by applying a coat of silicone to a paper, the silicone being applied at a coat weight of 0.5 lb/ream or less; applying an adhesive directly to a top layer; and laminating the liner with the silicone to the top layer using the adhesive.

In yet another aspect, there is provided a silicone-treated liner. The silicone-treated liner includes paper having a silicone coat weight of 0.5 lb/ream or less.

In yet another aspect, there is provided a method of preparing a liner. The method includes: applying silicone at a side of a paper at a coat weight of 0.5 lb/ream or less.

Figure 1:
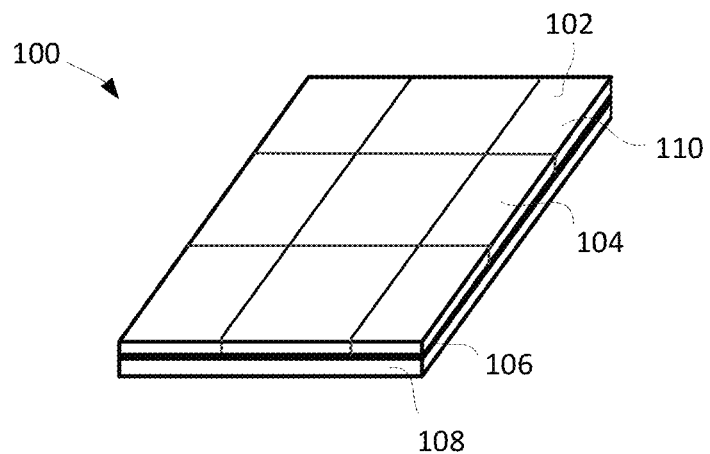
FIG. 1 shows a perspective view of a label assembly in accordance with example embodiments of the present disclosure.
Figure 2:
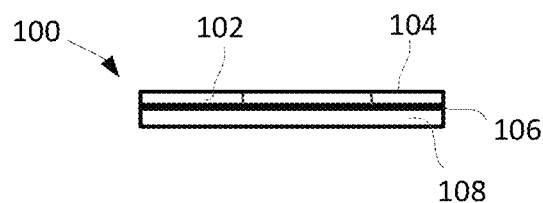
FIG. 2 shows a side view of the label assembly of FIG. 1.

Reference is first made to FIG. 1 and FIG. 2. FIG. 1 shows a perspective view of a label assembly 100 and FIG. 2 shows a side view of the label assembly 100. The label assembly 100 includes a plurality of pressure sensitive labels 110. The label assembly 100 includes a top layer 102. In the example illustrated, the top layer 102 is a label sheet which includes a plurality of pressure-sensitive label regions, each associated with a separate label 110. More particularly, the example label sheet includes nine label regions, each associated with a separate label 110. The number of labels provided on the label sheet may, however, be different in other embodiments.

The top layer 102 has a front side 104 and a back side opposite the front side. The front side 104 may be configured for receiving a printed layer, such as ink. Accordingly, the front side of the top layer 102 may include indicia printed thereon. Such indicia may be, for example, a graphic or text, which may be printed using ink. For example, in some embodiments, a logo may be printed on the label. In some embodiments, pricing information, nutritional information (e.g., associated with a food product), shipping information (such as a recipient or sender's address), or other information may be printed on the front side 104 of the top layer 102. The back side, which is not shown in FIG. 1 or FIG. 2, is parallel to the front side.

The label assembly 100 may, in at least some embodiments, be distributed as a blank label. That is, in some embodiments, the top layer 102 may not have indicia printed thereon when the label is distributed; the top layer 102 may be printed on or written on after manufacture (e.g. by an end user). The top layer 102 may also be referred to as a face sheet.

The top layer 102 is paper-based and may have a paper density between fifty and one hundred and fifty grams per square meter (GSM). In an embodiment, the top layer 102 is constructed of 75 GSM paper. The top layer 102 may be a film or plastic-based paper in other embodiments. In an embodiment, the top layer 102 is uncoated paper.

The label assembly 100 also includes an adhesive 106. In some embodiments, the adhesive is a repositionable adhesive. The repositionable adhesive is a microsphere adhesive which allows for repositioning of the label due to the use of small particles. The repositionable adhesive is a low-tack pressure-sensitive adhesive. For example, in some embodiments the adhesive is one that will provide a peel adhesion of between 80 and 204 gms if it were case directly onto 1 millimeter thickness polyester film and when tested on #304 stainless steel.

The adhesive may use particles (which may also be referred to as spheres) between 10 and 250 microns. In at least some embodiments, the adhesive may be of the type commonly used on Post-it™ notes. The adhesive may be of the type described in U.S. Pat. No. 3,691,140 which was filed Mar. 9, 1970 by Spencer Ferguson Silver and which is incorporated herein by reference.

The adhesive is applied to the back side of the top layer 102. More particularly, the adhesive 106 covers the entirety of the back side of the top layer 102. In at least some embodiments, the adhesive is applied to the back side of the top layer 102. The application of the adhesive 106 may be performed, in at least some embodiments, using a roller. Each label 110 that is provided by the top layer 102 has a back side that is entirely coated by the adhesive such that all portions of the back side are sticky. That is, the back side of each label region of the top layer directly contacts the adhesive 106.

The label assembly also includes a release liner 108, which will generally be referred to as a liner 108 herein. The liner 108 directly contacts the adhesive 106 at a side of the adhesive that is opposite the side that contacts the top layer 102. The liner contacts the entirety of a side of the adhesive. Accordingly, the liner 108 effectively sandwiches the adhesive between the top layer and the liner; the adhesive acts as a middle layer and the liner 108 acts as a bottom layer. The adhesive 106 and the liner 108 are the only two layers that are below the top layer 102; the adhesive 106 is the only layer between the liner 108 and the top layer 102.

The liner 108 includes silicone to impart release from the adhesive 106. The silicone is applied to the side of the liner that is to contact the adhesive 106. The release liner 108 is specially treated with silicone to allow the liner 108 to be recycled after use. This silicone is applied at a coat weight that is significantly less than the coat weight of traditional silicone-coated release liners. For example, typical silicone release liners use a silicone coat weight of approximately 1.0 to 1.2 lb/ream. In contrast, in at least some embodiments, the coat weight of the silicone in the release liner 108 used in accordance with the examples described herein is less than 0.5 lb/ream. In some embodiments, the coat weight of the silicone may be less than 0.3 lb/ream.

The coat weight of the silicone is sufficient to provide adequate release capabilities. It has been found that silicone coat weights as low as 0.22 lb/ream can provide sufficient release capabilities when the adhesive is a low tack adhesive. In some embodiments and with some adhesives, a coat weight of 0.15 lb/ream may provide sufficient release from the adhesive. Accordingly, in some embodiments, the coat weight of the silicone is 0.15 lb/ream or greater The liner 108 is a paper-based liner. That is, the liner 108 is constructed of paper, allowing for easy recycling of the liner 108. The liner has a paper density sufficient to allow the liner 108 to be removed without tearing. In at least some embodiments, the liner is constructed of a paper having a paper density greater between 50 and 150 grams per square meter. In one embodiment, uncoated 75 GSM paper is used.

In at least some embodiments, unlike traditional silicone-release liners, the paper used for the liner 108 is not a machine finished paper product or a super calendered kraft (SCK) paper. The paper used for the liner 108 may not have a side that has been finished to be smooth. That is, the silicone of the liner 108 is applied at a surface of the paper 108 which is porous since the surface has not been machine finished. In some embodiments, the paper may be bond paper (e.g., standard copy paper). Bond paper is a high quality durable writing paper similar to bank paper but having a weight greater than 50 g/m². By using such paper, the silicone is absorbed into the liner 108 and bonds with the fibers in the paper. That is, since the silicone (which is applied to the paper in liquid form) is not applied to a surface which has been finished with a smooth, glossy finish (as is done with traditional techniques), the silicone is absorbed into the paper rather than layered on top of the paper. The resulting liner 108 looks and feels like ordinary paper and it is difficult to distinguish the liner 108 from an ordinary piece of paper. As a result, a recycling facility processing the liner 108 can easily determine that the liner 108 is one that can be recycled. This can help to prevent a recycling depot from erroneously categorizing the liner 108 as a non-recyclable during sorting.

A liner 108 having such properties has been found to be recyclable using ordinary paper recycling techniques. That is, unlike traditional silicone-coated liners, the liner can be recycled without special handling precautions. For example, as noted above, the silicone on traditional silicone-coated liners is sometimes scraped from such liners so that they can be recycled. In contrast, the liner of the present application does not need such processing.

The liner 108 has an external side (i.e., bottom side) opposite the side of the liner that contacts the adhesive. The external side is also uncoated in an embodiment and does not contact any adhesive. In some embodiments, the label assembly may be provided on a roll, in which case the external side of the liner contacts the top layer of another portion of the roll.

The liner 108 is a single-layer liner.

In the embodiment of FIGS. 1 and 2, the top layer 102 is butt cut to produce a plurality of butt-cut labels 110. Butt cut labels have no gap between them and have square-corners. In at least some embodiments, the label assembly 100 may be perforated to allow the labels to be separated. More particularly, the liner 108 may be perforated at regions which demarcate the labels. That is, the perforations may separate one label 110 from another.

Figure 3:
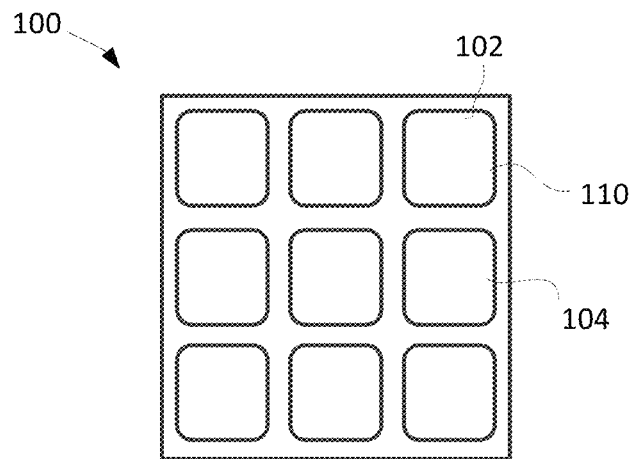
FIG. 3 shows a top view of a die cut label assembly in accordance with example embodiments of the present disclosure.

Referring now to FIG. 3, a top view of an alternate label assembly is illustrated. The label assembly of FIG. 3 has similar construction to that in FIGS. 1 and 2, except that the top layer 102 is die cut instead of being butt cut. Die cut labels 110 may have rounded corners and also have spacing between each label 110. That is, there is a gap separating one label 110 from another. Like the butt cut label assembly, the die cut label assembly may also include perforations separating one label 110 from another. The perforations may be provided midway between the labels (i.e., between midway between ends of each gap separating the labels).

As illustrated in FIGS. 1 to 3, the label assembly 100 may be provided in the form of a flat sheet. The flat sheet may, for example, be configured for insertion within a sheet-feed printer. For example, the flat sheet may be 8.5"×11", or another standard paper size. In such embodiments, the label assembly 100 may include a plurality of labels. In other embodiments, the label assembly 100 may be provided in the form of a roll. For example, the roll of labels may be configured for insertion within a printer that is adapted to receive a roll. For example, the labels may be scale labels that are used in a scale printer, such as a deli scale printer. A scale printer is a printer that is connected to a scale to allow for customized printing based on the weight measured at the scale.

Figure 4:
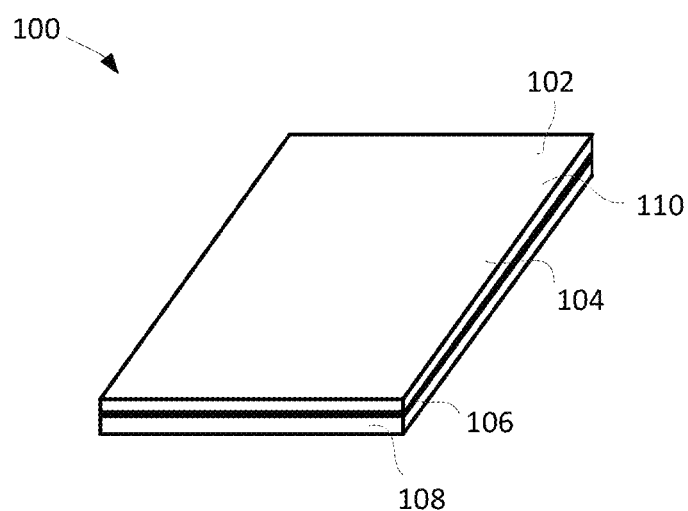
FIG. 4 is a perspective view of a label assembly that includes a single label in accordance with example embodiments of the present disclosure.

Referring now to FIG. 4, in some embodiments, the label assembly may include only a single label. More particularly, a label assembly having a top layer 102 that includes a single label 110 may be provided. The top layer 102 contacts the adhesive 108 as described above and the liner 108 contacts the other side of the adhesive as also described above.

The labels 110 that are described herein may be applied to a package by attaching the label to the body of the package. For example, the label may be applied to a box, plastic wrap, Styrofoam™, deli wrapping paper, etc. More particularly, to apply the label to the package body, the liner 108 is removed from the label 110 to expose the adhesive and the label 110 is applied to the package body using the adhesive. In using the label in this way, a package having a label of the type described herein is provided. For example, the label includes a top layer having a front side and a back side and a repositionable adhesive covering the entirety of the back side of the top layer. The label is applied to the package body such that the package body directly contacts the repositionable adhesive to sandwich the repositionable adhesive between the top layer and the package body.

Notably, traditional label manufacturing techniques are not well-suited for manufacturing a label 108 or liner 108 having at least some of the features described herein. As described in the background section above, traditional techniques use paper that has been manufactured to have a finish that prevents liquid from being absorbed into the paper. For example, traditional techniques may use a paper that has a smooth, machine finished surface. This is used, at least in part, to prevent the adhesive, which is applied as a liquid to the liner as part of the transfer coating process, from soaking into the liner. Since the machine finish also prevents absorption of the silicone, the silicone is layered on the paper forming the liner when the liner is manufactured using traditional techniques. Recycling facilities typically identify such layering during sorting and sort the products containing the layer of silicone as non-recyclables.

A method 500 for manufacturing a label assembly (and a liner) will now be described with reference to FIG. 5, which illustrates a flowchart of the method 500.

At operation 502, a liner 108 is formed by coating a paper with silicone. In at least some embodiments, the silicone is applied at a coat weight of less than 0.5 lb/ream. In some embodiments, the coat weight of the silicone may be less than 0.3 lb/ream. The coat weight may be greater than 0.15 lb/ream. In some embodiments, the coat weight of silicone may be approximately 0.22 lb/ream.

The paper may be of sufficient density to prevent tearing of the liner 108 during removal. In at least some embodiments, the liner is constructed of a paper having a paper density between 50 and 150 grams per square meter. In one embodiment, uncoated 75 GSM paper is used.

The silicone is applied to a surface of the paper that is not processed to have a machine finish or gloss. For example, the silicone may be applied to a surface that is porous, having an absorbency similar to standard copy paper. The surface that the silicone is applied to is non-finished and non-glossy. In some embodiments, the paper that the silicone is applied to is standard copy paper. The side of the paper that the silicone is not applied to (i.e. the side that is opposite the side where the silicone is applied) may have a glossy finish, or may not have a glossy finish.

The silicone may be applied to the paper in liquid form; for example, with a roller. In other embodiments, the silicone may be sprayed onto the surface of the paper.

After the silicone is applied to the paper, it may be cured at operation 504. For example, in some embodiments, the silicone is cured using ultraviolet (UV) lamps. In some embodiments, the silicone may be a water-based silicone which is cured by drying the silicone using a dryer.

At operation 506, an adhesive 106 is applied directly to the bottom of the top layer 102. That is, the adhesive 106 is applied directly to the face sheet of the label 110. In contrast to traditional techniques, the method 500 of FIG. 5 does not rely upon a transfer coating process to apply the adhesive 106 to the label 110. Rather, the adhesive 106 is applied directly to the label. For example, the adhesive may be applied to the top layer 102 of the label with a roller or sprayer.

The top layer 102 may be of the type described above and the adhesive may also be of the type described above.

Figure 5:
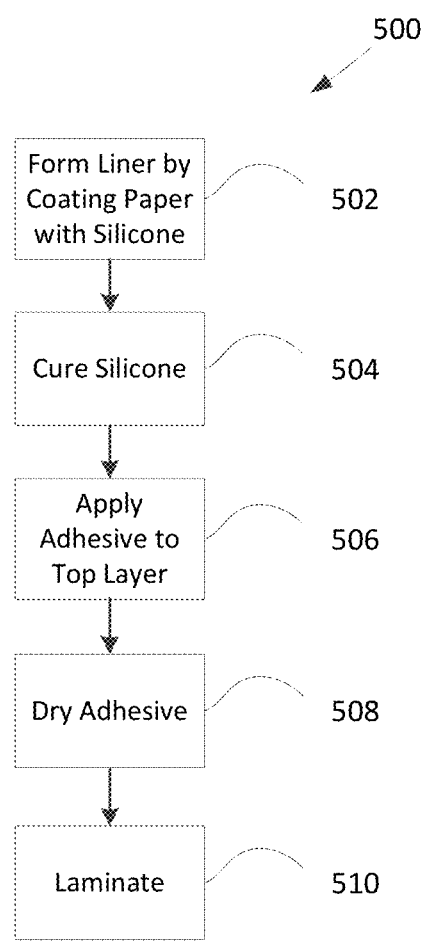
FIG. 5 is a flowchart of a method for manufacturing a label assembly in accordance with example embodiments of the present disclosure.

While FIG. 5 illustrates the application of the adhesive 106 to the top layer 102 as occurring after the paper is coated with silicone (at operation 502), in practice, the ordering of these steps may be different. In some embodiments, these steps may be performed in parallel.

The adhesive may be applied in liquid form and, at operation 508, the top layer 102 and the adhesive 106 are passed through a dryer to remove moisture from the adhesive.

At operation 510, the top layer 102 is laminated to the liner 108. More particularly, the adhesive provided on the top layer is brought into contact with the liner 108, causing the liner 108 to adhere to the top layer using the adhesive. Since the liner 108 has been treated with silicone, it can easily be removed from the top layer and adhesive. The side of the liner 108 that has been coated with silicone is the side that is brought into contact with the adhesive. Thus, the side of the liner 108 that contacts the adhesive does not have a machine finish or gloss.

In some embodiments, after lamination further operations may be performed to further process the label assembly. For example, the label assembly may be further processed by cutting the top layer into a plurality of regions, each associated with a separate label. The cutting may include die cutting or butt cutting or sheeting. Sheeting produces rectangular labels with square corners that are sheeted individually.

Furthermore, in at least some embodiments, the liner may be perforated to create a plurality of regions, each associated with a separate label.

While the embodiments described herein have generally described paper-based top layers 102, in other embodiments, the top layer 102 may be polyethylene terephthalate (PET) based or may be constructed of other films and coated papers of various thicknesses. For example, in some embodiments, the top layer 102 may be PET-based to allow for improved performance in wet environments (e.g., where the label is to be applied to a bottle).

Certain adaptations and modifications of the described embodiments can be made. Therefore, the above discussed embodiments are considered to be illustrative and not restrictive.

What is claimed is:

1. A method of preparing a recyclable liner for a label assembly to allow the recyclable liner to be detachably coupled to a top layer of the liner assembly with a permanent adhesive, the method comprising:
    applying a coat of silicone to a paper at a side of the paper that does not have a machine finish or gloss finish and is otherwise uncoated to allow the silicone to be absorbed into the paper to bond with the fibers in the paper; and
    curing the silicone to produce the recyclable liner, wherein the recyclable liner is recyclable without scraping off the silicone.

2. The method of claim 1, wherein the paper has a silicone coat weight of 0.5 lb/ream or less measured at a treatment surface of the paper.

3. The method of claim 2, wherein the silicone coat weight is 0.3 lb/ream or less measured at a treatment surface of the paper.

4. The method of claim 2, wherein the silicone coat weight is greater than 0.15 lb/ream measured at a treatment surface of the paper.

5. The method of claim 2, wherein the silicone coat weight is approximately 0.22 lb/ream measured at a treatment surface of the paper.

6. The method of claim 1, wherein the paper is bond paper.

7. The method of claim 1, wherein the silicone is applied as a fiber coat directly to fibers of the paper.

8. The method of claim 1, wherein the recyclable liner is constructed of a paper having a paper density greater than or equal to fifty grams per square meter.

9. The method of claim 1, wherein the recyclable liner is a single layer liner.

10. The method of claim 1, wherein the recyclable liner is perforated at regions which demarcate labels of the label assembly.

* * * * *